United States Patent [19]

Weis et al.

[11] Patent Number: 4,735,655

[45] Date of Patent: Apr. 5, 1988

[54] SINTERED ABRASIVE MATERIAL

[75] Inventors: Günter Weis, Wattens; Albert Cuel, Mils, both of Austria

[73] Assignee: D. Swarovski & Co., Wattens, Austria

[21] Appl. No.: 910,624

[22] Filed: Sep. 23, 1986

[30] Foreign Application Priority Data

Oct. 4, 1985 [DE] Fed. Rep. of Germany ....... 3535659

[51] Int. Cl.$^4$ ...................... C22C 29/08; C22C 29/10; C22C 29/12; C22C 29/16

[52] U.S. Cl. ........................ 75/231; 75/232; 75/236; 75/238; 75/239; 75/240

[58] Field of Search ................. 75/231, 243, 247, 232, 75/236, 238, 239, 240; 420/470, 474, 475, 476, 477, 491

[56] References Cited

U.S. PATENT DOCUMENTS

| | | | |
|---|---|---|---|
| 2,137,201 | 11/1938 | Boyer . | |
| 2,831,243 | 4/1958 | Thomson | 75/247 |
| 2,833,638 | 5/1958 | Owen . | |
| 3,525,609 | 8/1970 | Roberts | 75/247 |
| 3,552,954 | 1/1971 | McDonald | 75/247 |
| 3,650,715 | 3/1972 | Brushek et al. | 75/247 |
| 3,893,820 | 7/1975 | Davies et al. | 75/247 |

FOREIGN PATENT DOCUMENTS

| | | |
|---|---|---|
| 1190199 | 4/1965 | Fed. Rep. of Germany . |
| 1298855 | 7/1969 | Fed. Rep. of Germany . |
| 1010506 | 11/1965 | United Kingdom . |

Primary Examiner—John F. Terapane
Assistant Examiner—Eric Jorgensen
Attorney, Agent, or Firm—Sandler & Greenblum

[57] ABSTRACT

The invention provides a flexible, deformable sintered abrasive material made of a bronze alloy with particulate abrasive grain. The alloy consists essentially of 3 to 30 wt. % of Ag, 0 to 1 wt. % of Si, 0.05 to 3 wt. % of Ge, Sn, Pb, Zn and/or Cd, the remainder being copper. The sintered abrasive material is best suited for abrasive material carriers with concave or convex surfaces or for winding around grinding drums.

14 Claims, No Drawings

SINTERED ABRASIVE MATERIAL

BACKGROUND OF THE INVENTION

The present invention relates to a sintered abrasive material conventionally, for rough-grinding and precision-grinding concave or convex surfaces, which are made of metal, ceramics, glass or the like, dome-shaped or hemispherical carriers, to which numerous sintered abrasive materials, e.g., "diamond pellets", are attached are used. After these abrasive materials are attached to the carrier they must be trued to a desired radius, which proves to be an elaborate operation.

If the same abrasive materials are to be used for grinding a surface of a different radius, they must be first detached from the carrier, reattached to a different carrier, and again trued, which process is timeconsuming and result in loss losses of material. It is, therefore, desirable for many reasons to have a sintered abrasive material which adapts to different curved surfaces with different radii right from the beginning, and thus, requires minimum truing.

The invention is directed to providing a sintered abrasive material which adapts to different curved surfaces with different radii due to its flexibility and overcomes the disadvantages associated with conventional types of abrasive materials.

The sintered abrasive material of the invention is a bronze alloy with particulate abrasive grain, in which the material essentially consists of
3 to 30 wt.% of Ag;
0 to 1 wt.% of Si; and
0.05 to 3 wt.% of Ge, Sn, Pb, Zn and/or Cd,
the remainder being copper.

The copper content of the alloy is between 70 and 98 wt.%, preferably 85 to 95 wt.%, and more particularly 90 and 95 wt.%.

The silver content is between 3 and 30 wt.%, preferably 5 to 10 wt.% and in particular 4 to 6 wt.%.

Silicon may be present in an amount of up to 1 wt.%. Preferably, 0.1 to 0.5, and more particularly 0.2 to 0.4 wt.%.

The metals Ge, Sn, Pb, Zn and/or cadmium are present in an amount of 0.05 to 3 wt.%, preferably 0.2 to 1.0, and more particularly 0.2 to 0.6 wt.%. Zinc and/or cadmium are preferred as alloying additions.

Surprisingly enough, the abrasive material having the above mentioned composition is flexible and deformable so that it can be adapted to various curved surfaces with different radii. Thus, a completely new variety of abrasive material is provided for grinding curved surfaces.

The adaptation of the claimed abrasive material to various curved surfaces, is not attained by mechanical, galvanic or thermal means but is based on its flexibility. If such a flexible abrasive material is attached to its carrier reversibly, e.g., by means of solder, melt adhesive or another separable adhesive or else mechanically, it can be easily detached and reattached to a differently curved surface. Thus, the inventive abrasive material can be used successively to occupy differently curved carriers without any great effort and without any loss of material. The flexible abrasive material is attached to the curved surfaces by pressing by using a suitable countermold means,and a suitable attaching medium is provided between the carrier and the abrasive material. Depending on the type of the medium, this process is carried out with or without the action of temperature.

A curved surface may be occupied either in one piece or with segments. The segments should be close together or have channels therebetween for better chip escape and for better admission of coolant.

The sintered abrasive material of the invention is produced by mixing 70 to 98 wt.% of copper, 3 to 30 wt.% of silver, 0 to 1 wt.% of Si and 0.05 to 3 wt.% of germanium, tin, lead, zinc and/or cadmium in powder form, whereby two or more components may also be used as powders of their alloys with each other. For the abrasive grains, all known types of abrasive grain may be used, such as diamond, garnet, pumice stone, tripolite, corundum, emery, diatom earth, grinding sands, sandstones, borides, carbides, in particular boron carbide, tungsten carbide, titanium carbide, niobium carbide, tantalum carbide, zirconium carbide, molybdenum carbide, chromium carbide and silicon carbide, nitrides, e.g. boron nitride, oxides, in particular aluminum oxide, silicon oxide, titanium oxide, zirconium oxide and cerium oxide and carbonitrides. The abrasive grains may be used with the usual graining.

The abrasive grain may be present in a part by volume of 1 to 50%, preferably 5 to 30%, and more particularly 10 to 25%. The part by weight may, in the case of diamond, for example, be between 0.1 and 1.8 g/cm$^3$, and preferably between 0.2 and 0.9 g/cm$^3$. Other abrasive grains may also be used in the stated parts by weight. Generally, concentrations of abrasive grains in the range of C 25 to C 200 can be used. It is within the scope of the invention to use even higher concentrations of the abrasive grains.

In addition, auxiliary agents may be added for the mixture to improving its pressability and pourability.

This powdery mixture is prepressed and sintered. The sintering is effected at a temperature of 500° to 600° C. in a hot sintering press under a pressure of 80 to 400 kp/cm$^2$.

This is preferably, followed by a thermal aftertreatment in the furnace, which is effected for one to four hours at 750° to 900° C. It may consist of simple tempering at a constant temperature.

The invention shall be elucidated with reference to the following example:

EXAMPLE

A bronze alloy was mixed in powder form with a content of
93.58 wt.% of Cu,
5.78 wt.% of Ag,
0.24 wt.% of Si and
0.4 wt.% of Zn.

Particulate diamonds were added to this mixture in an amount of 0.4 g/cm$^3$. The mixture was then prepressed and sintered. The sintering process was carried out at a temperature of 580° C. in a hot sintering press under a pressure of 200 kp/cm$^2$.

A thermal aftertreatment was then carried out in two steps.
(1) 1 h at 580° C.,
(2) 1 h at 750° C.
The sintered abrasive material was then allowed to cool off slowly.

The sintered abrasive material thus obtained was flexible, capable of being shaped on and plastically deformable.

What is claimed is:

1. A sintered abrasive material made of a bronze alloy containing particulate abrasive grain, said bronze alloy comprising:
   (a) 3–30% by weight of Ag;
   (b) 0.1–1% by weight of Si; and
   (c) 0.05–3% by weight of Ge, Sn, Pb, Zn and/or Cd, wherein the remainder comprises copper.

2. The sintered abrasive material of claim 1, wherein the content of said particulate abrasive grain is 0.15–2.00 g/cm$^3$ of said bronze alloy.

3. The sintered abrasive material of claim 2, wherein said particulate abrasive grain is selected from the group consisting of a diamond, a garnet, a pumice stone, a tripolite, corundum, emery, diatom earth, grinding sand, sandstone, a boride, a carbide, a nitride, an oxide and a carbonitride.

4. The sintered abrasive material of claim 3, wherein said carbide is selected from the group consisting of boron carbide, tungsten carbide, titanium carbide, zirconium carbide, tantalum carbide, molybdenum carbide, chromium carbide, and silicon carbide.

5. The sintered abrasive material of claim 3, wherein said nitride is boron nitride.

6. The sintered abrasive material of claim 3, wherein said oxide is selected from the group consisting of aluminum oxide, silicon oxide, titanium oxide, zirconium oxide and cerium oxide.

7. The sintered abrasive material of claim 1, wherein the contents of Ag and Si are 4–6% and 0.2–0.4%, respectively, by weight of said bronze alloy, and the total content of Zn and Cd is 0.2–0.6% by weight of said bronze alloy.

8. The sintered abrasive material of claim 7, wherein the content of Zn is 0.2–0.6% by weight of said bronze alloy.

9. The sintered abrasive material of claim 7, wherein the content of Cd is 0.2–0.6% by weight of said bronze alloy.

10. The sintered abrasive material of claim 1, wherein the contents of Ag and Si are 5–10% and 0.1–0.5%, respectively, by weight of said bronze alloy, and the total content of Ge, Sn, Pb, Zn and/or Cd is 0.2–1.0% by weight of said bronze alloy.

11. The sintered abrasive material of claim 1, wherein the content of copper is 70–98% by weight of said bronze alloy.

12. The sintered abrasive material of claim 1, wherein the content of copper is 85–95% by weight of said bronze alloy.

13. The sintered abrasive material of claim 1, wherein the content of copper is 90–95% by weight of said bronze alloy.

14. The sintered abrasive material of claim 1, wherein said bronze alloy consists essentially of:
   (a) 3–30% by weight of Ag;
   (b) 0.1–1% by weight of Si; and
   (c) 0.05–3% by weight of Ge, Sn, Pb, Zn and/or Cd, wherein the remainder comprises copper.

* * * * *